United States Patent [19]
De Laforcade

[11] Patent Number: 6,077,579
[45] Date of Patent: Jun. 20, 2000

[54] CONTAINER HAVING LONGITUDINAL GROOVES WITH AT LEAST ONE STRIP OF A DIFFERENT COLOR AND/OR APPEARANCE

[75] Inventor: Vincent De Laforcade, Rambouillet, France

[73] Assignee: L'Oreal, Paris, France

[21] Appl. No.: 08/944,973

[22] Filed: Oct. 7, 1997

[30] Foreign Application Priority Data

Oct. 7, 1996 [FR] France ................................. 96 12198

[51] Int. Cl.[7] .............................. A45D 34/00; B65D 1/02; B65D 23/00; B65D 35/08
[52] U.S. Cl. ........................ 428/35.7; 428/122; 428/167; 220/662; 220/671; 220/675; 215/383; 206/459.1; 206/459.5; 206/776
[58] Field of Search ................... 428/35.7, 36.6, 428/36.8, 36.91, 542.8, 188, 167, 174, 181, 199, 122; 220/288, 600, 602, 662, 663, 669, 670, 671, 672, 673, 674, 675; 206/459.1, 459.5, 776, 781, 778; 264/505, 514, 516; 425/131.1; 215/349, 382, 383

[56] References Cited

U.S. PATENT DOCUMENTS

| | | | |
|---|---|---|---|
| 3,343,568 | 9/1967 | Branscum et al. | 138/178 |
| 4,613,640 | 9/1986 | Deisler et al. | 524/264 |
| 4,890,994 | 1/1990 | Shapler et al. | 425/131.1 |
| 5,464,107 | 11/1995 | Koeniger | 215/12.2 |
| 5,704,504 | 1/1998 | Bueno | 215/381 |
| 5,804,305 | 9/1998 | Slat et al. | 428/36.7 |

FOREIGN PATENT DOCUMENTS 0 508 168 A1  10/1992  European Pat. Off. .
2 150 918     7/1995   United Kingdom .

*Primary Examiner*—Ellis Robinson
*Assistant Examiner*—John Fiqueroa
*Attorney, Agent, or Firm*—Oblon, Spivak, McClelland, Maier & Neustadt, P.C.

[57] ABSTRACT

A container for a product of a liquid-to-pasty consistency, having at least one longitudinal strip which is of a color and/or appearance different from a color and/or appearance of a remainder of the container and which is delimited by two lateral edges. The lateral edges of the longitudinal strip or strips are situated substantially within longitudinal grooves so as to conceal any variations of width of the longitudinal strip. The container can be constructed of thermoplastic material in an injection molding device.

16 Claims, 4 Drawing Sheets

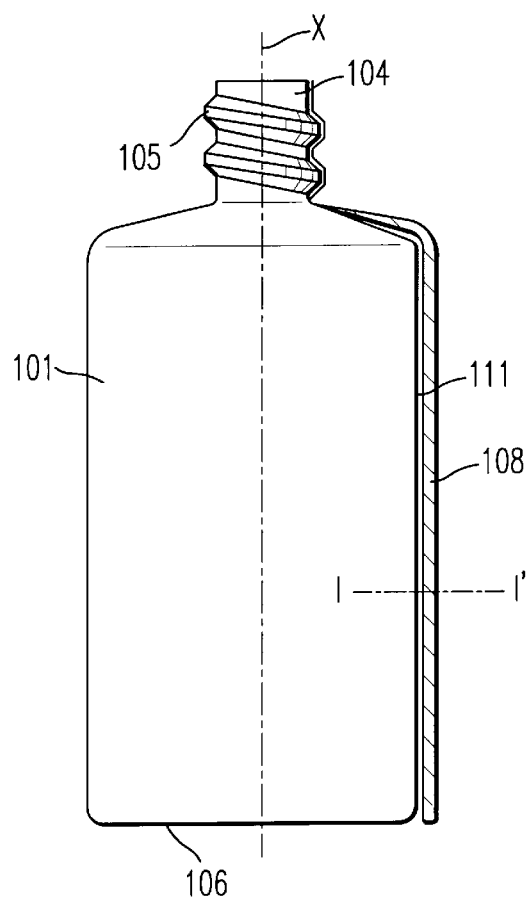
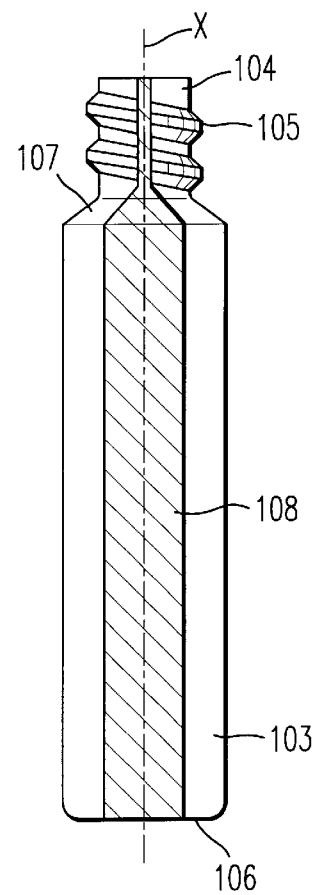
*FIG. 3A*
*FIG. 3B*
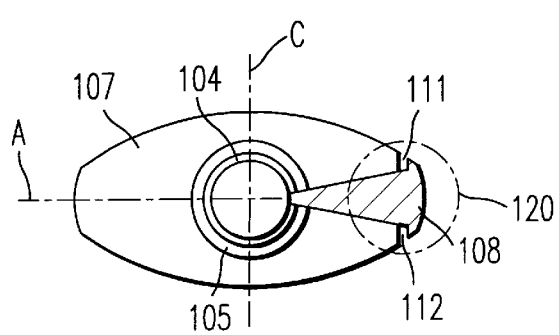
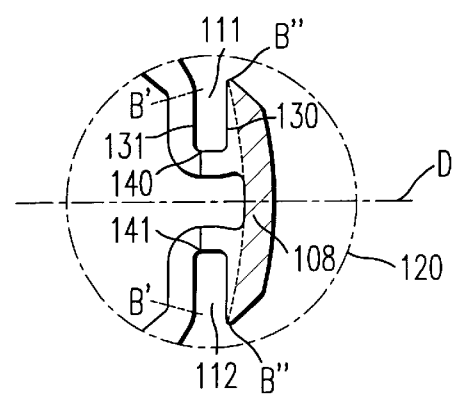
*FIG. 3D*
*FIG. 3C*

6,077,579

CONTAINER HAVING LONGITUDINAL GROOVES WITH AT LEAST ONE STRIP OF A DIFFERENT COLOR AND/OR APPEARANCE

BACKGROUND OF THE INVENTION

1. Field of the Invention

The present invention relates to a container such as a bottle, pouch, or tube for products of a liquid-to-pasty consistency. Such containers are used in particular for the packaging of cosmetic products, such as shampoos, care creams, lotions, or pastes such as tooth pastes.

2. Discussion of the Background

In packaging and bottling fields, and particularly in cosmetics, one is always working to find novel and original packaging means. Additional steps of decorating containers and bottles is often relied upon. However, these steps increase costs of manufacture and, in a case of containers made of a plastic material, do not always give a very satisfactory aesthetic result.

Bottles and containers have been proposed having at least one relatively narrow strip orientated along a main axis of the bottle and made of a material of a color different from a color of material forming a remainder of the container. Apart from its aesthetic nature, by using a translucent material this longitudinal strip may make it possible to let a user know how much product remains in the container. Moreover, a zone of a different color may be used to indicate to the user the place where it is desirable to squeeze the bottle so as to optimize emptying the container. Such a container with a translucent strip is described, for example, in EP-A-0 508 168 or in U.S. Pat. No. 343,568.

Again, by way of example, EP-A-0 385 942 describes a bottle obtained by extrusion blow molding from a parison of which at least one strip is made of a material of a hardness different from a hardness of the rest of the material, so as to impart better rigidity to the final structure of the bottle.

Typically, such containers are generally made by blow molding a tubular blank obtained by extrusion or injection molding. In the case of a container made of two materials the blank or parison may be obtained by coextrusion or duplex injection molding.

In extrusion technology, plastic materials are heated and subjected to pressure by a screw/sleeve assembly so as to provide, by means of an extrusion head, a tubular blank in a form of a hot parison. This tubular blank is subsequently placed between two female half molds which have the required shape to mold the desired container, and blow molding permits shaping of the parison as it expands under pressure and assumes the shape defined by the mold. cooling permits the material to set in the shape thus obtained.

In the case of coextrusion, the extrusion head is fed by two feeding channels so that the parison has a narrow strip of a material of a different composition and/or color, the initial width of the strip in the parison being calculated according to a desired width of a strip on the container. In fact, as increased material is forced by blow molding to move away from its initial position, an increased amount of material is stretched and refined in width and thickness.

With the injection molding technology, or more precisely duplex injection technology, in the case of a container made of two materials including a longitudinal strip, a tubular blank generally called a "preform" is created in a mold wherein a part of a bottle formed by the first material is molded in the first step. Means in the form of a mold slide prevent this first material from flowing into a zone corresponding to the longitudinal strip. The mold slide is then withdrawn and the second material is cast into a thus vacated volume so as to form the longitudinal strip.

One of the problems linked to these technologies is illustrated in FIGS. 1A–1C. The container shown is a bottle of a type comprising a body 1 with a longitudinal axis X, closed at one of its ends by a bottom 2 and surmounted by a neck 4 to which the body is joined by a shoulder 3. The neck 4 has a thread 5 intended to receive in a detachable manner a stopper (not shown).

A cross-section of the bottle illustrated in FIG. 1B has an elongate shape and has a major axis A and a minor axis C. One of the edges 11 parallel to the minor axis C is constituted by a strip of material of a color different from a color of the rest of the bottle. As shown in FIG. 1A, the resulting differently colored strip is not straight, but has borders with the rest of the bottle which fluctuate around a median position.

FIG. 1C shows an enlargement area 10 of the edge of the cross-section of the bottle (delimited by the enlargement area 10 of FIG. 1B). Thus, although it is desirable to have a differently colored strip delimited by straight edges, in practice, each one of the lateral edges 40, 41 of the strip fluctuates between a minimum position B" and a maximum position B'. The variations produce a visual effect that does not give a clear-cut impression, and may adversely affect perception of potential clients regarding contents of the container.

The above fluctuations are linked to the manufacturing process and may be explained in particular by micro air currents and temperature gradients which may have a significant influence on movements of the parison. Similarly, small variations in density inside the materials themselves, or small temperature variations, may affect the fluidity and expansion potential of the materials, producing variations in width of the strip of different color and/or kind.

The above variations are more noticeable, when the strip 12 differs in color from the rest of the bottle. They may also be more noticeable and an additional drawback when the materials are of a different appearance. For example, if the longitudinal strip is made of an elastomer of a matte appearance to improve gripping of the bottle, while the rest of the bottle has a rather shiny appearance, the fluctuations of the edges of the strip will be more visible. similarly, the longitudinal strip may have a granular appearance, while the rest of the container has a smooth appearance, or vice versa.

Another problem occurring in the field of packaging and bottling, in particular in the field of cosmetics, relates to holding the package or bottle in the hand, in particular in conditions where, for example in the case of a shampoo, the user has wet hands. For this purpose, a special shape is utilized that follows a shape of the hand. There also exist bottles which have an extra layer of an elastomeric material at certain points, for example. However, these systems have a drawback of complicating the manufacturing process, substantially increasing the manufacturing cost of these containers. If the improved gripping zone is obtained during molding by coextrusion/blow molding, in a form of one or several longitudinal strips, there then arises the problem of distinctness of the lateral edges of the strips such as described above.

SUMMARY OF THE INVENTION

Accordingly, it is an object of the present invention to provide a novel container having a longitudinal strip constituted by a material of a color and/or appearance different from the material forming the rest of the bottle and comprising means for concealing variations in a width of the longitudinal strip, inherent in the manufacturing process.

Another object of the present invention is to create a container made of a single material or two materials, with an improved rigidity, and whose structure allows it to be picked up in a hand, and having an improved tactility.

These and other objects are attained by means of a thermoplastic container for a product of a liquid-to-pasty consistency, the container having a longitudinal axis and at least one longitudinal strip which is of a color and/or appearance different from a color and/or appearance of a remainder of the container and is delimited by two lateral edges, wherein the lateral edges of the longitudinal strip (or strips) are situated substantially within longitudinal grooves so as to conceal variations in width of the strip. Advantageously, the container is made by blow molding a tubular blank in a mold comprising at least two shell portions capable of being joined around a joint plane, the longitudinal grooves being orientated substantially perpendicularly to the joint plane.

In a preferred embodiment, the tubular blank is made by coextrusion of two physically and chemically compatible materials, such as polyethylene terephthalate (PET), polyvinyl chloride (PVC), or polyolefins. Alternatively, the tubular blank is made by the duplicate injection molding of materials such as polypropylene, polyethylene, nylon, polyvinyl chloride (PVC), or polyethylene terephthalate (PET).

The longitudinal strip may be translucent so as to allow an external view of a quantity of product remaining in the container. It may also be made of a thermoplastic elastomer compatible with the material forming the rest of the bottle. By way of example, it is possible to use a sequenced copolymer of styrene-ethylene-butadiene (SEBS) or a terpolymer of ethylene, propylene and a diene (EPDM). In addition, the grooves may form a substantially U-shaped recess.

The container in accordance with the present invention may take a form of a bottle comprising a body with a bottom at one end and its other end terminated in a neck intended to receive a stopper in a detachable manner, the longitudinal strip extending substantially over a height of the body of the bottle. Advantageously, the body of the bottle has a cross-section of an elongate shape, (oval, elliptical, truncated or not truncated at its ends) having a major axis and a minor axis, the grooves being disposed on either side of the major axis so as to delimit a side which is substantially straight and substantially perpendicular to the major axis, said side being of a color and/or appearance different from a color and/or appearance of the rest of the bottle. In one embodiment, the longitudinal strip may be from 5 mm to 2 cm.

Advantageously, the grooves are orientated substantially parallel to the longitudinal strip flanked by them and define a double elastic hinge between the strip and the rest of the container, allowing the longitudinal strip to pivot substantially round a median plane between the two grooves, for example under pressure from a user's fingers. This characteristic imparts an agreeable touch and a better grip of the bottle. Moreover, rigidity of the bottle is increased in a region of the hinges.

The above-embodiments are advantageous for containing product of a liquid-to-pasty consistency that may be, but not limited to, a shampoo, a care cream, a hairdressing gel, a toothpaste, etc.

BRIEF DESCRIPTION OF THE DRAWINGS

A more complete appreciation of the invention and many of the attendant advantages thereof will be readily obtained as the same becomes better understood by references to the following detailed description when considered in connection with the accompanying drawings, wherein:

FIG. 3A illustrates a front view of the container of FIG. 2;

FIG. 3B illustrates a side view of the container of FIG. 2;

FIG. 3C illustrates a sectional view along I—I of FIG. 3A;

FIG. 3D illustrates a top view of the container of FIG. 2.

DESCRIPTION OF THE PREFERRED EMBODIMENTS

Figure 1A:
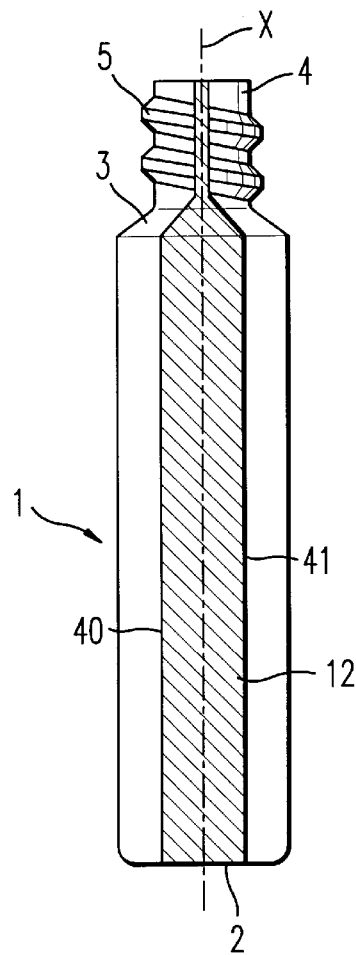
FIG. 1A illustrates a conventional container.
Figure 1B:
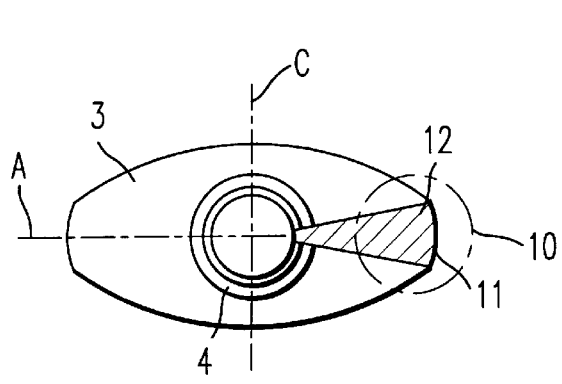
FIG. 1B illustrates a top view of the conventional container of FIG. 1A.
Figure 1C:
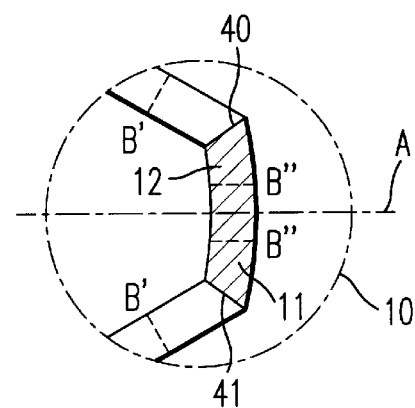
FIG. 1C illustrates an enlargement area 10 of the top view in FIG. 1B.
Figure 2:
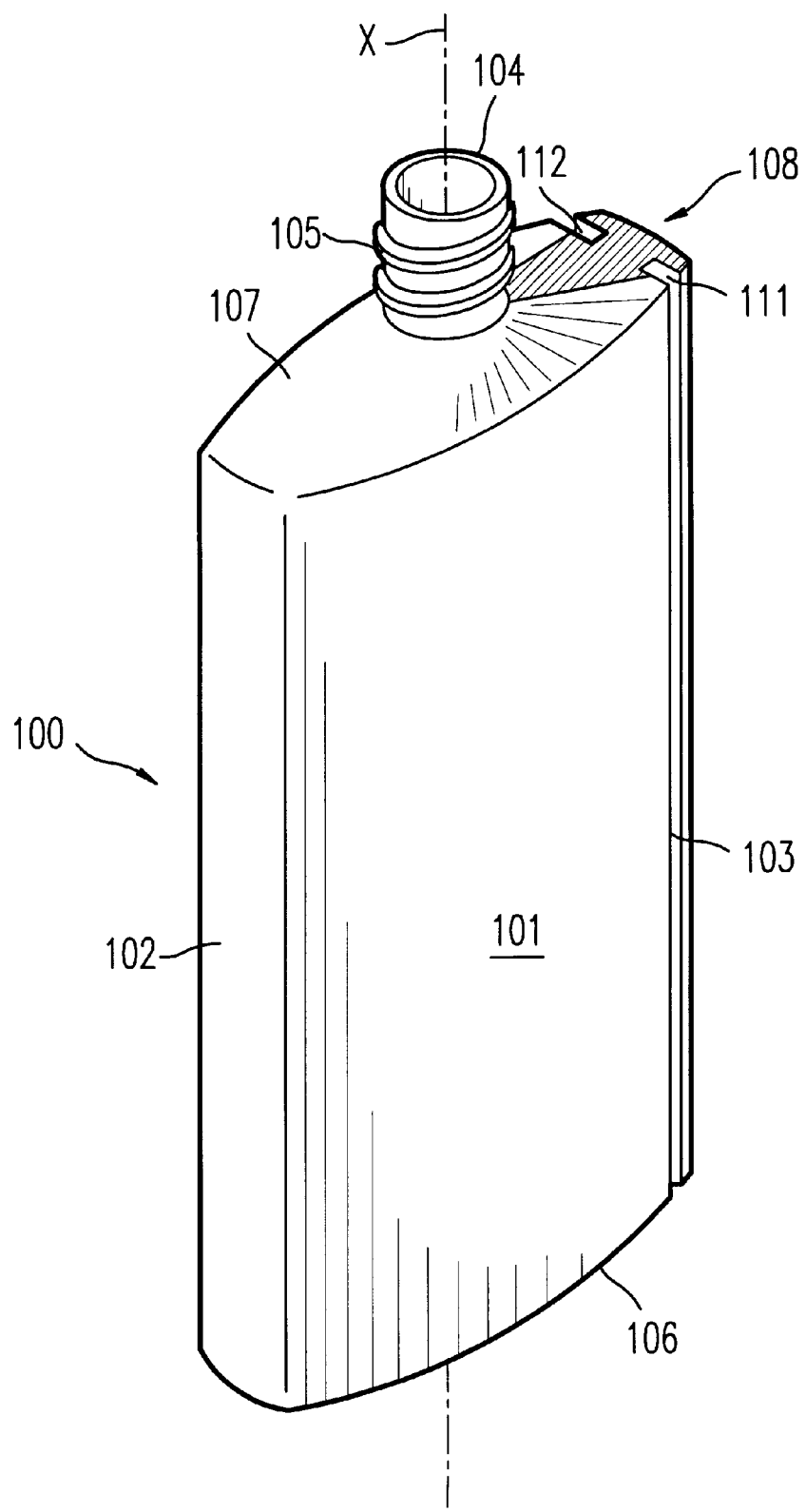
FIG. 2 illustrates a container in accordance with the present invention.

Referring now to the drawings, wherein like reference numerals designate identical or corresponding parts throughout the several views, and more particularly to FIG. 2 thereof, an embodiment of a container 100 in accordance with the present invention is illustrated. The container 100 has a body 101 of an elongate shape, with a longitudinal axis X, and having two substantially straight sides 102, 103. The body forms a flexible or semirigid wall and is closed at one of its ends by a bottom 106. At its other end, it is surmounted by a neck 104 comprising an external thread 105 intended to cooperate with the internal thread of a stopper (not shown). The neck is joined to the body of the bottle by a shoulder 107.

The container 100 has at least one longitudinal strip 108 of an appearance and/or color different from the appearance and or color of a remainder of the container. Preferably, the strip is formed substantially over an entire height of the container. According to an important characteristic of the present invention, the longitudinal strip is flanked by two longitudinal grooves 111, 112 intended, as will be seen in detail below, to conceal variations in width of the strip of a different color and/or appearance.

The present inventor has determined that it is advantageous not to deal directly with the problem related to the variation in width of the longitudinal or color strip 108, but rather, to conceal these variations, so that the strip appears perfectly straight. For this purpose, the longitudinal edges 140, 141 (see FIG. 3C, for example) of the color strip are disposed within grooves 111, 112, whose geometry and dimensions are such that, for a strip whose width derived from blow molding may vary between a minimum value B" and a maximum value B', the longitudinal edges 140, 141 of the strip are, over a whole height of the strip, within the two grooves 111, 112 flanking the strip. Thus, although the strip still has variations in width inherent in the manufacturing process, the visible edges of the strip are delimited rectilinearly by the grooves (see FIGS. 3B and 3C, for example).

Figure 5:
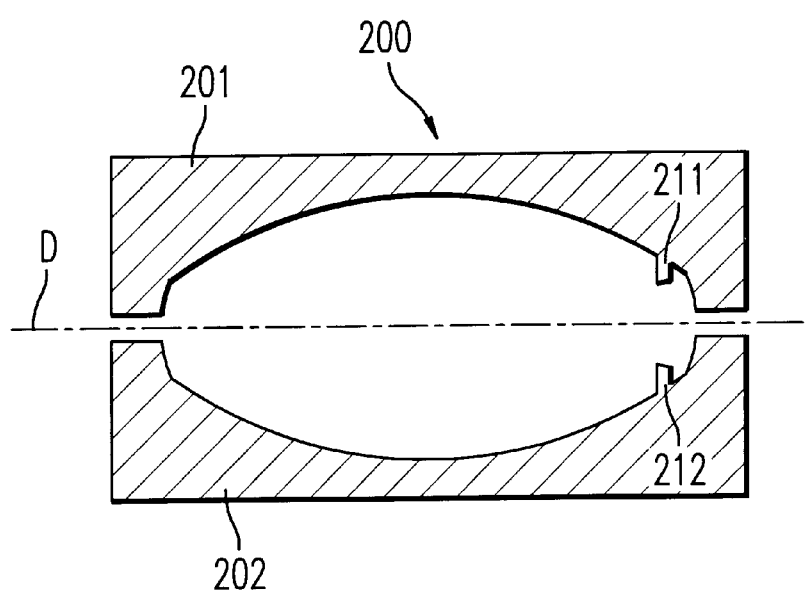
FIG. 5 illustrates a cross-section of a mold used for making the container of FIG. 2.

A container in accordance with the invention may be made conventionally by blow molding a tubular blank (obtained by coextrusion or by duplex injection molding) in a mold. A cross-section of a mold 200 used for the container 100 of FIG. 2 is shown in FIG. 5.

The mold 200 comprises two female half molds (shells) 201, 202 capable of being joined round a joint plane, or demolding plane D. The mold 200 is of a shape complementary to a shape of the container 100. It has two ribs 211, 212, on either side of the joint plane, of a shape complementary to a shape of the grooves 111, 112 of the container. The ribs are orientated to allow the container to be removed from the mold, that is to say they are substantially perpendicularly to the joint plane. However, this last characteristic is not as important for some kinds of materials, such as elastomers, whose elasticity facilitates removal from the mold. Moreover, the shape of the mold described with reference to FIG. 5 is only given by way of example. There exist other types of molds consistent with the present invention, for example, formed by more than two portions (three or four, for example), depending on the shape of the container to be made, and capable of being joined around three or four joint lines. The grooves in the container must here also be orientated so as not to impede removal from the mold.

FIGS. 3A–3D, to which reference will now be made, illustrate the concealment of the variations in width of the strip in accordance with the invention in a more precise manner. FIG. 3A is a front view of an embodiment of the container in accordance with the invention. FIG. 3B is a side view of the container. FIG. 3C is a sectional view along I—I of the side of the container. FIG. 3D is a top view of the container.

As has already been mentioned, and as is clearly apparent from FIGS. 3C and 3D, the longitudinal strip 108 is joined to the rest of the container by two grooves 111, 112 of a height (along the main axis of the bottle) substantially equal to the height of the body of the container. A first groove 111 is disposed on one side of the joint plane D, a second groove 112 being disposed on another side of the joint plane D, each groove being disposed in such a way as to delimit a substantially straight side. In the embodiment shown in FIGS. 3A to 3D, the longitudinal strip is centered on the joint plane D. All these considerations, although preferable from an aesthetic point of view for the shape of the bottle shown, do not however constitute any obligatory characteristics.

The grooves 111, 112 are disposed so as to allow the container to be taken out of the mold. In the case of a mold with two half shells such as represented in FIG. 5, the grooves are orientated perpendicularly to the demolding plane D. As becomes clearly apparent in FIG. 3B, the strip 108 has visible edges that are perfectly straight.

As shown in FIG. 3C, the grooves 112 define a U-shaped recess. However, other shapes may be obtained (a V shape for example), the important point being that the longitudinal edges 140, 141 of the color strip should be situated inside the grooves between a minimum position B" and a maximum position B'. Beyond a boundary defined by B" and B', the longitudinal edges of the strip would be visible from outside the container. Geometrical characteristics of the grooves are thus determined according to an amplitude of the variations of the width generated by the process. By way of example, a visible width of the color strip corresponds to a width of the side of the container and is of an order of 1 cm. A width of the grooves along the major axis A is of an order to 1 mm. A depth of the grooves along axis B is also of the order of 1 mm. More generally, the strip of a different color and/or appearance may have a visible width of from 5 mm to 2 cm.

According to an alternative, not shown, the container comprises such a strip of a different color and/or appearance at each one of its sides.

The tubular blank used for blow molding can be obtained in a conventional way by coextrusion, or by multi-injection molding (duplex injection molding in the case of two materials) of materials which are physically and chemically compatible with one another. For example, materials that are capable of creating a bond between them by thermofusion during their coextrusion. In the case of extrusion, which constitutes the preferred technology, materials are used such as polyethylene terephthalate (PET), polyvinyl chloride (PVC) or polyolefins (polyethylene, polypropylene). In the case of injection molding, materials are used such as polypropylene, polyethylene, nylon, polyvinyl chloride (PVC) or polyethylene terephthalate (PET).

According to a particular embodiment, the strip 108 is made of a translucent material, so as to allow a quantity of product remaining in the container to be seen.

Advantageously, the longitudinal strip may be made of a thermoplastic elastomer, such as a sequenced copolymer of styrene-ethylene-butadiene (SEBS) or a terpolymer of ethylene propylene and a diene (EPDM) of the SANTO-PRENE® type marketed by the AES Company. Such a characteristic imparts an agreeable touch and imparts an improved grip, particularly when the container is handled in difficult conditions, with wet hands for example.

Figure 4:
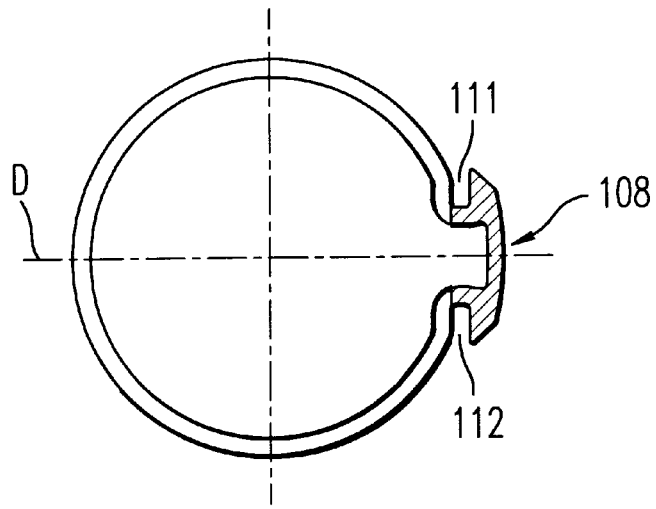
FIG. 4 illustrates a cross-section of a second embodiment of the container according to the present invention.

The shape of the container described above is only given by way of illustration. It is obvious that this container may come, in the same way as shown in FIG. 4, in the form of a bottle whose cross-section has a circular shape. Yet other forms (hexagonal, square etc.) may be envisaged. It may also be a tube closed at one of its ends, the other end being surmounted by a neck whereon a stopper is disposed in a detachable manner. The tube may be closed at its bottom by a transverse weld line or other closing means. The neck of the container may be surmounted by a pump with a renewed air intake, and the body of the container may be of a type with one or more layers.

The embodiment illustrated in FIGS. 3A to 3D, wherein the grooves 111, 112 are orientated substantially parallel to the color strip, is particularly advantageous in that it produces a completely original impression when the user grips the container. Indeed in this configuration, the grooves 111, 112 define a double elastic hinge between the strip 108 and the rest of the bottle. This hinge allows the strip to pivot substantially around a median plane between the bottom of the two grooves flanking it, under pressure exerted by the user's fingers, in particular because of elasticity of the material, that is to say round the demolding plane D connecting the two joint lines in the illustrated embodiment. Movement is limited on either side of the pivoting plane when the edge 130 common to the groove 111 and the color strip 108 comes to abut against an opposite edge 131 of the groove. This gives a tactile impression of suppleness and grip, linked to a high rigidity of the container as a whole.

Moreover, the longitudinal strip advantageously forms an original means for presentation of the container according to the present invention as a packaging unit, in particular on the large surfaces. Indeed, the packaging unit may be mounted on slides arranged so as to cooperate with the grooves delimiting the strip of a different color and/or appearance. According to the same principle, such a packaging unit may be carried on a belt of the user by means of a mechanism with slides. Thus the product may be easily carried, in particular in the case of a moisturizing product, or a sun screen product for walkers.

Obviously, numerous modifications and variations of the present invention are possible in light of the above teach- It is therefore to be understood that within the scope of the appended claims, the invention may be practiced otherwise than as specifically described herein.

What is claimed as new and desired to be secured by Letters Patent of the United States is:

1. A thermoplastic container, comprising:

a thermoplastic body;

said body having at least one thermoplastic longitudinal strip which is different in at least one of a color and appearance from a color and appearance of a remainder of the container; and said at least one thermoplastic longitudinal strip being delimited by longitudinal edges and flanked by longitudinal grooves forming a recess situated so that said longitudinal edges are located within said longitudinal grooves in order to conceal variations in width of said longitudinal strip.

2. The container according to claim 1, wherein said body is made by blow molding a tubular blank in a mold comprising at least two female mold portions capable of being joined around a joint plane, said longitudinal grooves being orientated substantially perpendicularly to the joint plane.

3. The container according to claim 2, wherein the tubular blank is made by one of coextrusion and duplex injection molding of two physically and chemically compatible materials.

4. The container according to claim 3, wherein the tubular blank is made by coextrusion of materials including at least one of polyethylene terephthalate (PET), polyvinyl chloride (PVC), and polyolefins.

5. The container according to claim 3, wherein the tubular blank is made by duplicate injection molding of materials including at least one of polypropylene, polyethylene, nylon, polyvinyl chloride (PVC), and polyethylene terephthalate (PET).

6. The container according to claim 1, wherein said at least one longitudinal strip is translucent so as to allow a quantity of product in the container to be visible from outside the container.

7. The container according to claim 1, wherein said at least one thermoplastic longitudinal strip is made of a thermoplastic elastomer that is physically and chemically compatible with a material forming a remainder of the container.

8. The container according to claim 7, wherein the thermoplastic elastomer is one of a sequenced copolymer of styrene-ethylene-butadiene (SEBS) and a terpolymer of ethylene, propylene and a diene (EPDM).

9. The container according to claim 1, wherein said longitudinal grooves form a substantially U-shaped recess.

10. The container according to claim 1, wherein the container is a tube which is closed at one end and at another end has surmounted a neck including a detachable stopper.

11. The container according to claim 1, comprising:

the body being a bottle having opposed ends and defining a longitudinal axis X, said bottle comprising, a bottom provided at one of said opposed ends, and a neck extending from another of said opposed ends and having a detachable stopper;

at least one bottle.

12. The container according to claim 11, wherein:

the body of the bottle has perpendicular to the longitudinal axis X an elongated cross-sectioned shape defining a major axis and a minor axis;

said longitudinal grooves are disposed on either side of the major axis so as to define a delimited side which is substantially straight and substantially perpendicular to the major axis; and said delimited side forming said at least one longitudinal strip.

13. The container according to claim 1, wherein said at least one thermoplastic longitudinal strip has a width of from 5 mm to 2 cm.

14. The container according to claim 1, wherein:

said longitudinal grooves are oriented substantially parallel to said at least one thermoplastic longitudinal strip such that said at least one thermoplastic longitudinal strip is elastically pivotable around a median plane between said longitudinal grooves.

15. The container according to claim 1, wherein said container contains a product of a liquid-to-pasty consistency.

16. The container according to claim 1, wherein said thermoplastic body has a height and said at least one thermoplastic longitudinal strip extends substantially over the entire height of the thermoplastic body.

* * * * *